Patented June 18, 1940

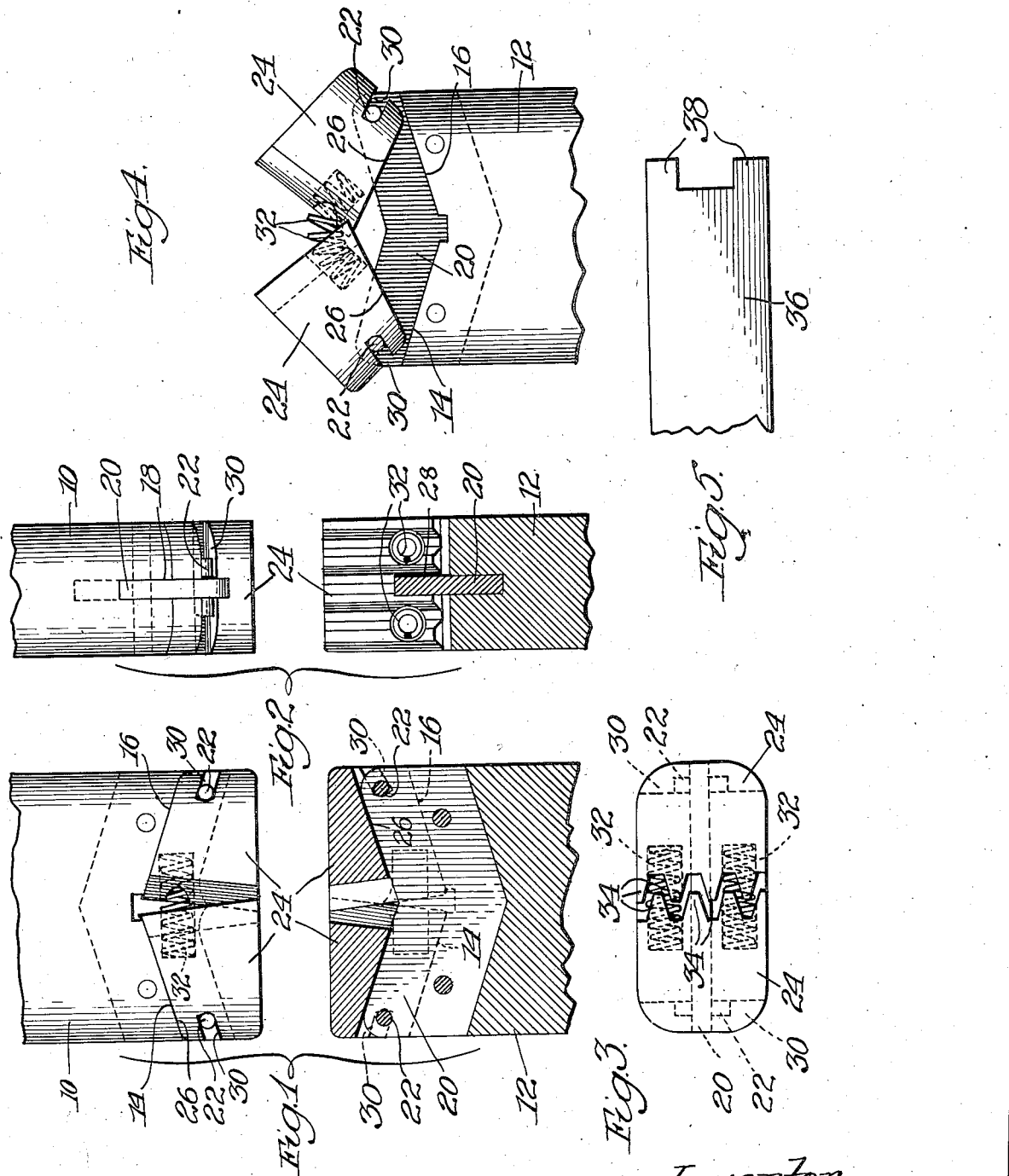

2,205,079

UNITED STATES PATENT OFFICE 2,205,079

METAL FORMING MACHINE

Henry A. Berliner, Washington, D. C., assignor, by mesne assignments, to Engineering and Research Corporation, Riverdale, Md., a corporation of Maryland Application October 29, 1938, Serial No. 237,612

8 Claims. (Cl. 78—60)

This invention relates to metal forming machines and more particularly to an arrangement of jaws for shrinking or stretching sheet metal.

One of the objects of the invention is to provide a metal forming machine including metal engaging jaws which may be removed and replaced quickly and easily. This is highly desirable to provide for cleaning or lubrication of the jaws or in case it is desired to replace them.

Another object of the invention is to provide a metal forming machine including movable jaws in which resilient means serving to move the jaws in one direction also acts to hold the jaws on the machine.

Still another object of the invention is to provide a metal forming machine including movable jaws formed with elongated grooves to receive guide flanges on the machine. According to one feature the guide flanges carry pins or the like against which the jaws are yieldingly pressed to hold them in place on the machine.

Other objects and advantages of the invention will be apparent from the following description of the embodiment shown in the accompanying drawing, in which:

Figure 1 is a partial view of a machine illustrating a pair of jaws with one inside elevation and the other in section;

Figure 2 is an end view of the jaws showing one in end elevation and the other in section;

Figure 3 is a top plan view of one of the jaks;

Figure 4 is a side elevation of one of the jaws in partially removed position; and Figure 5 is an elevation of a removing tool.

The machine illustrated includes a pair of jaws of the type more particularly disclosed and claimed in the patent to Junkers No. 1,761,887 and comprises a pair of jaws supporting press members 10 and 12 adapted to be moved toward and away from each other by any suitable mechanism not shown. Each press member is formed on its outer end with a pair of cam surfaces 14 and 16 sloping inwardly from the sides of the member. An elongated groove 18 extends from side to side of each member and receives a guide flange 20 extending from side to side of the member substantially centrally of the cam surfaces. The flange 20 carries at its ends adjacent the sides of the cam supporting member a pair of transverse pins 22.

Each member is adapted to support a pair of jaws and since all of the jaws are identical only one will be described in detail. The jaws are indicated at 24 and each is formed with a cam surface 26 adapted to engage one of the cam surfaces 14 or 16. Each jaw is further formed with a longitudinal central groove 28 slidably to receive the flange 20 so that the jaws may move sideways of the supporting members and will be guided by the flange 20. Each jaw is formed in its end with a transverse slot or groove 30 to receive one of the pins 22. The grooves 30 parallel the cam surfaces 26 and have a depth slightly in excess of the jaw movement.

The jaws are urged apart by a pair of springs 32 lying on opposite sides of the flange 20 and engaging the jaws at points eccentric to a line between the pins 22. As shown the springs lie closer to the cam surfaces 26 than do the pins 22 so that a toggle action is provided urging the jaws against the cam surface.

The jaws are formed at their inner ends with intermeshing tooth-like members 34 adapted to interfit as best seen in Figure 3 so as to provide support for a sheet of metal being worked upon while at the same time permitting the jaws to move sideways toward and away from each other.

In use a sheet of metal to be shrunk is placed between two sets of jaws and the press is operated to move the jaws alternately into and out of engagement with opposite sides of the metal. When pressure is exerted on the jaws, they move together along the cam surface against the springs 32 and squeeze or shrink the metal between them. The surfaces of the jaws may be roughened if desired to obtain a better grasp on the metal. By reversing the cam surfaces, it will be apparent that the metal will be stretched rather than shrunk.

If it is desired to remove the jaws for cleaning, lubrication or the like, a tool such as illustrated in Figure 5 may be employed. As shown, this tool comprises a flat metal strip 36 of a width approximately equal to the width of the jaws and of a thickness substantially equal to the width of the slots 30. At one end the strip 36 is formed with a pair of projecting lugs 38 adapted to enter the slot 30 on opposite sides of the flange 20. With the strip in this position the jaws may readily be turned to the position shown in Figure 4 after which they may easily be removed by hand. To replace the jaws, the slots 30 may be slid over the pins 22 in the position shown in Figure 4 and the center portion of the jaws may then be pressed down by hand to the position of Figure 1.

While only one embodiment of the invention has been shown and described in detail, it will be apparent that many changes might be made therein and it is not intended to limit the scope of the invention to the exact form shown nor otherwise than by the terms of the appended claims:

What is claimed is:

1. In a metal forming machine, a jaw supporting member having a pair of cam surfaces sloping inwardly from the sides of the member, an outwardly extending flange carried by said member and extending outwardly from said cam surfaces, and a pair of jaws each formed with a cam surface engaging one of the cam surfaces on said member and having a groove therein embracing said flange.

2. In a metal forming machine, a jaw supporting member having a cam surface, an outwardly extending flange carried by said member and extending outwardly from said cam surface, a pin carried by said flange, and a jaw formed with a cam surface engaging the cam surface on said member and having a pair of grooves therein to receive the flange and the pin respectively, said pin and the groove in the jaw which receives it serving to hold the jaw in place on the supporting member.

3. In a metal forming machine, a jaw supporting member having a plurality of cam surfaces, an outwardly extending flange carried by said member and extending outwardly from said cam surfaces, a cross pin carried by each end of said flange, and a pair of jaws, each jaw having a cam surface engaging one of the cam surfaces on the member and having a pair of intersecting grooves therein one of which receives the flange and the other of which receives one of said pins.

4. In a metal forming machine, a jaw supporting member formed with a cam surface, a transverse pin carried by said member spaced from the cam surface, a jaw formed with a cam surface to engage the cam surface on said member and having a transverse groove therein to receive said pin, and yielding means to urge said jaw in a direction to move the groove over the pin.

5. In a metal forming machine, a jaw supporting member formed with a pair of cam surfaces, a pair of transverse pins carried by said member at the opposite ends of said cam surfaces, a pair of jaws formed with cam surfaces to engage the cam surfaces on said member and having transverse grooves to receive said pins, and yielding means urging said jaws apart to move said grooves over the pins.

6. In a metal forming machine, a jaw supporting member formed with a pair of cam surfaces sloping inwardly from the sides of the member, a pair of transverse pins carried by said member adjacent the sides thereof a pair of jaws each formed with a cam surface to engage one of the cam surfaces on said member and each having in its outer end a transverse groove to receive one of said pins, and resilient means urging the jaws apart, said resilient means engaging the jaws at points falling outside of a line between the pins.

7. In a metal forming machine, a jaw supporting member formed with a pair of cam surfaces sloping inwardly from the sides of the member, a guide flange extending from side to side of said member along the cam surfaces, a pair of transverse pins carried by said flange adjacent the sides of the member, a pair of jaws each formed with a cam surface to engage one of the cam surfaces on said member and with a groove to receive said flange and each having in its outer end a transverse groove to receive one of said pins, and resilient means urging the jaws apart, said resilient means engaging the jaws at points falling outside of a line between the pins.

8. In a metal forming machine, a jaw supporting member formed with a pair of cam surfaces sloping inwardly from the sides of the member, a guide flange extending from side to side of said member along the cam surfaces, a pair of transverse pins carried by said flange adjacent the sides of the member, a pair of jaws each formed with a cam surface to engage one of the cam surfaces on said member and with a groove to receive said flange and each having in its outer end a transverse groove to receive one of said pins, and resilient means urging the jaws apart, said resilient means engaging the jaws at points falling outside of a line between the pins, said transverse grooves being formed to receive a tool by which the jaws may be tilted about said pins to remove the jaws.

HENRY A. BERLINER.